United States Patent
Ohori et al.

(10) Patent No.: US 6,239,850 B1
(45) Date of Patent: *May 29, 2001

(54) LIQUID CRYSTAL ELECTRO-OPTICAL DEVICE AND PROCESS OF FABRICATING SAME PROVIDED WITH DISCHARGE ACCELERATING PATTERNS FOR MINIMIZING DIELECTRIC BREAKDOWN

(75) Inventors: Tatsuya Ohori, Tokyo; Michiko Takei, Kanagawa; Hongyong Zhang, Kanagawa; Jun Koyama, Kanagawa, all of (JP)

(73) Assignee: Semiconductor Energy Laboratory Co., Ltd., Kanagawa-ken (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/841,849

(22) Filed: May 5, 1997

(30) Foreign Application Priority Data

May 8, 1996 (JP) .................................................. 8-139460

(51) Int. Cl.[7] .................................................. G02F 1/1333
(52) U.S. Cl. .................................................. 349/40; 349/139
(58) Field of Search ................................... 349/152, 149, 349/40, 139

(56) References Cited

U.S. PATENT DOCUMENTS

| | | | |
|---|---|---|---|
| 4,586,789 | * 5/1986 | Kishimoto et al. | 349/152 |
| 5,233,448 | * 8/1993 | Wu | 349/40 |
| 5,313,319 | * 5/1994 | Salisbury | 349/40 |
| 5,327,267 | * 7/1994 | Aoki et al. | 349/40 |
| 5,349,226 | * 9/1994 | Kawaguchi et al. | 349/152 |
| 5,546,204 | * 8/1996 | Ellis | 349/46 |
| 5,598,283 | * 1/1997 | Fujii et al. | 349/152 |
| 5,677,745 | * 10/1997 | Kawano et al. | 349/42 |
| 5,684,546 | * 11/1997 | Kim | 349/40 |
| 5,734,458 | * 3/1998 | Ikubo et al. | 349/152 |
| 5,781,253 | * 7/1998 | Koike et al. | 349/40 |
| 5,798,812 | * 8/1998 | Nishiki et al. | 349/152 |

FOREIGN PATENT DOCUMENTS 260-141 * 3/1988 (GB) .................................................. 349/152

* cited by examiner

Primary Examiner—William L. Sikes
Assistant Examiner—Toan Ton
(74) Attorney, Agent, or Firm—Fish & Richardson P.C.

(57) ABSTRACT

A process of fabricating a liquid crystal electro-optical (display) device. The device includes discharge accelerating patterns extending from associated gate bus patterns and provided with a unique geometry. The disclosed geometry minimizes the dielectric breakdown of a gate insulating film attributable to plasma discharge between gate and source/drain electrodes of the associated thin film transistors.

16 Claims, 5 Drawing Sheets

LIQUID CRYSTAL ELECTRO-OPTICAL DEVICE AND PROCESS OF FABRICATING SAME PROVIDED WITH DISCHARGE ACCELERATING PATTERNS FOR MINIMIZING DIELECTRIC BREAKDOWN

BACKGROUND OF THE INVENTION

1. Field of the Invention

The present invention generally relates to a liquid crystal electro-optical (display) device, and particularly, to an active matrix liquid crystal electro-optical (display) device (referred to simply hereinafter as "LCD") using a thin film transistor (referred to simply hereinafter as "TFT") and to a process for fabricating the same.

2. Description of the Related Art

Active matrix LCDs are widely used in color LCDs having a large number of pixels, because they not only can suppress cross talk among the pixels, but also enable high speed driving.

In active matrix LCDs, the pixels are each driven individually by the corresponding TFTs. The TFTs, in turn, are driven by a plurality of wiring patterns formed in rows and columns on a glass substrate constituting the display panel of the LCD. Generally, the wiring patterns are formed by depositing a low-resistance aluminum (Al) layer on the substrate, and then patterning the Al layer by means of wet etching. A higher aperture ratio can be achieved by decreasing the wiring pattern width. Recent studies have focused on performing patterning by a better and more controlled dry etching process.

Attempts to carry out dry etching using a high frequency electric field on an insulator, i.e., the glass substrate, however, sometimes generate charge up on the substrate resulting in induced discharge among the wiring patterns. Such a discharge could damage the fine wiring patterns. Alternate approaches that prevent charge up from occurring are sought.

FIG. 6 shows a wiring pattern formed on a glass substrate 10 in a conventional active matrix LCD.

FIG. 6 shows a gate driver 11 formed on a glass substrate 10. A plurality of gate bus patterns $11_1$, $11_2$, $11_3$, ... $11_n$, made of Al or an Al alloy, extend from the gate driver 11 along the row direction. A data driver 12 is formed on the glass substrate 10, and a plurality of data bus patterns $12_1$, $12_2$, $12_3$, ... $12_n$, also made of Al or an Al alloy, extend from the data driver 12 along the column direction. Gate bus patterns $11_1$, $11_2$, $11_3$, ... $11_n$ constitute the patterns of a first layer, while the data bus patterns $12_1$, $12_2$, $12_3$ ... $12_n$ constitute the patterns of a second layer. TFTs are formed so as to correspond to respective crossing points of gate bus patterns $11_1$, $11_2$, $11_3$, ... $11_n$ with data bus patterns $12_1$, $12_2$, $12_3$ ... $12_n$. The crossing points define a TFT matrix. Furthermore, a connection pad 13 is formed in the substrate 10 in order to electrically connect the substrate 10 with another substrate (not shown in the figure) disposed opposed thereto.

Discharge attributable to the charge up occurs in the hatched region shown in FIG. 6 when dry etching gate bus patterns $11_1$, $11_2$, $11_3$, ... $11_n$ or data bus patterns $12_1$, $12_2$, $12_3$ ... $12_n$. This charge up could, due to plasma discharge, damage the gate bus patterns $11_1$, $11_2$, $11_3$, ... $11_n$ or the data bus patterns $12_1$, $12_2$, $12_3$ ... $12_n$. Dielectric breakdown of the gate insulating film is generated which can cause element failure when a high electric field is locally applied to the gate bus patterns $11_1$, $11_2$, $11_3$, ... $11_n$. Dry etching is widely employed in the fabrication of Si LSIs as well as for so-called SOI structures. However, in the case of LCDs, the size of the substrate 10 is too large and dry etching generally proceeds from the periphery. Accordingly, the peripheral region represented by hatched lines in FIG. 6 is exposed to plasma for a particularly long duration of time.

As a solution, it has been proposed circumventing the discharge. This may be done by forming, during LCD fabrication, a short ring 14, by using a short circuit in the gate bus patterns $11_1$, $11_2$, $11_3$, ... $11_n$ and in the data bus patterns $12_1$, $12_2$, $12_3$ ... $12_n$. The short ring 14 is removed upon the completion of the LCDs, i.e., at the point during the fabrication each of the panels are cut apart. Each of the data bus patterns $12_1$, $12_2$, $12_3$ ... $12_n$ are connected to the short ring 14 at contact holes 14a.

However, in order to achieve yet higher performance, definition and resolution, it is important to further reduce the resistance of the wiring layers and to further narrow wire width. The short ring 14 of FIG. 6 has been insufficient for lowering discharge.

It has been found that damage attributed to a discharge occurs frequently when a metal having a low resistivity, such as Al, is employed in the wiring layer, as well as in fine wires having a width as narrow as about 3 $\mu$m. This may be explained as follows. When a metal having low resistivity is exposed to a plasma, the metal is more apt to suffer local concentration of electric field because the electric field applied to the metal is hard to attenuate. Moreover, an electric field tends to concentrate at the portion having a finer dimension.

The problem of damaged wiring patterns from plasma discharge is particularly serious when fabricating a high resolution LCD using a large area substrate, a low resistivity metal such as Al as the wiring material, and when employing dry etching to form the wiring pattern. Furthermore, plasma discharge not always occurs only when performing dry etching. For instance, the source and drain of a TFT are formed by a process of ion implantation using a resist mask. Sometimes the substrate is treated in an oxygen plasma to strip off the resist which was hardened by the ion implantation. Discharge may also occur in the course of such an oxygen plasma treatment.

SUMMARY OF THE INVENTION

In the light of the aforementioned circumstances, an object of the present invention is to overcome the aforementioned problems, and to provide a novel and useful liquid crystal electro-optical (display) device and a process for fabricating the same.

More specifically, an object of the present invention is to provide a liquid crystal electro-optical (display) device which realizes minimization of the damage attributed to plasma discharge, and to provide a process for fabricating the same.

Thus, according to a first aspect of the present invention, there is provided a process for fabricating a liquid crystal electro-optical (display) device having a wiring pattern provided on a substrate constituting a liquid crystal display panel, comprising: a step of forming a discharge accelerating pattern structure in the wiring pattern exclusive of the display region of the liquid crystal display panel, so that a distance between neighboring wire pattern is set at a length twice or less as long as that of a minimum wire width of the individual wiring pattern.

According to a second aspect of the present invention, there is provided a process for fabricating a liquid crystal electro-optical (display) device as described in the first aspect above, wherein the wiring pattern is formed by dry etching.

According to a third aspect of the present invention, there is provided a process for fabricating a liquid crystal electro-optical (display) device as described in the first aspect above, wherein the distance between the neighboring wiring patterns is set at such a length that discharge occurs easily among the wiring patterns.

According to a fourth aspect of the present invention, there is provided a process for fabricating a liquid crystal electro-optical (display) device as described in any one of the first to third aspects, wherein the discharge accelerating pattern structure is provided as a branched structure from the wiring pattern and comprises a branch having an end, so that the distance between the end and the wiring pattern disposed opposed thereto is set at a length twice or less as long as that of the minimum wire width of the wiring pattern.

According to a fifth aspect of the present invention, there is provided a liquid crystal electro-optical (display) panel comprising a substrate having a wiring pattern provided thereon, wherein the wiring pattern comprises a discharge accelerating pattern structure therein exclusive of the display region of the liquid crystal electro-optical (display) panel, so that the distance between the neighboring wiring patterns is set at a length twice or less as long as that of the minimum wire width of the wiring pattern.

Also according to a sixth aspect of the present invention, there is provided a liquid crystal electro-optical (display) panel as described in the fifth aspect above, wherein the distance between the neighboring wiring patterns is set at such a length that discharge occurs easily among the wiring patterns.

Further according to a seventh aspect of the present invention, there is provided a liquid crystal electro-optical (display) panel as described in the fifth and the sixth aspects, wherein the discharge accelerating pattern structure is provided as a branched structure from the wiring pattern and comprises a branch having an end, provided in such a manner that the distance between said end and the wiring pattern disposed opposed thereto is set at a length twice or less as long as that of the minimum wire width of the wiring pattern.

In accordance with the present invention, a discharge accelerating pattern structure is formed in the wiring pattern provided on the substrate in such a manner that the display region of the liquid crystal electro-optical (display) panel is excluded from the structure, provided that the distance between the neighboring wiring patterns is set at a length twice or less as long as that of the minimum wire width of the wiring pattern. In this manner, discharge is allowed to generate selectively in the structure during the fabrication process of the LCD. Thus, the problem of causing discharge in the wiring patterns of the display region of the liquid crystal display panel, which is attributed to the charge up of the substrate, can be overcome in this manner.

PREFERRED EMBODIMENT OF THE PRESENT INVENTION

The present invention will now be described in further detail below with reference to the preferred embodiments of the present invention. It should be understood, however, that the present invention is not to be construed as being limited to the embodiments below.

Figure 1:
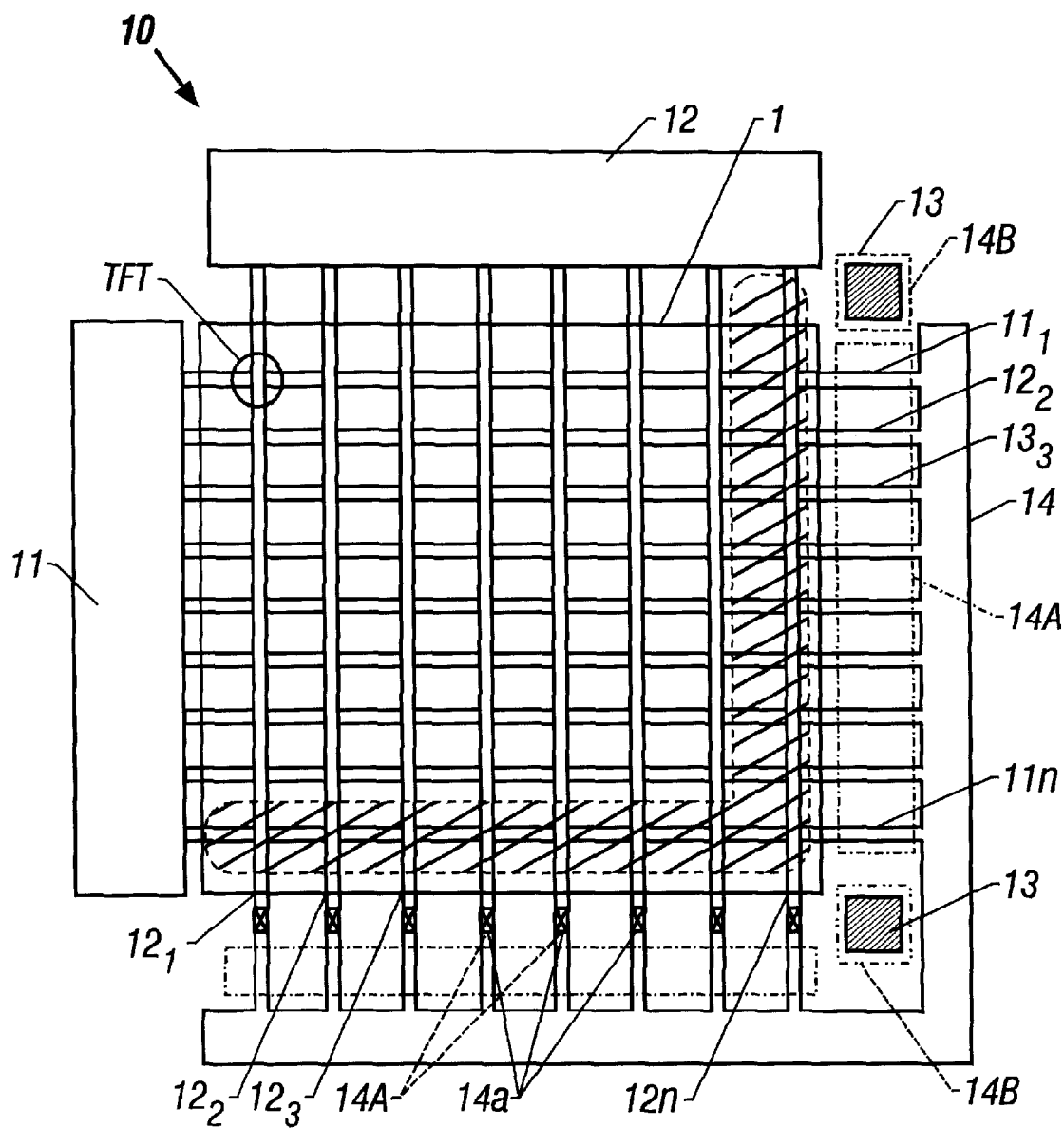
FIG. 1 shows a constitution of an LCD according to one embodiment of the present invention.
Figure 6:
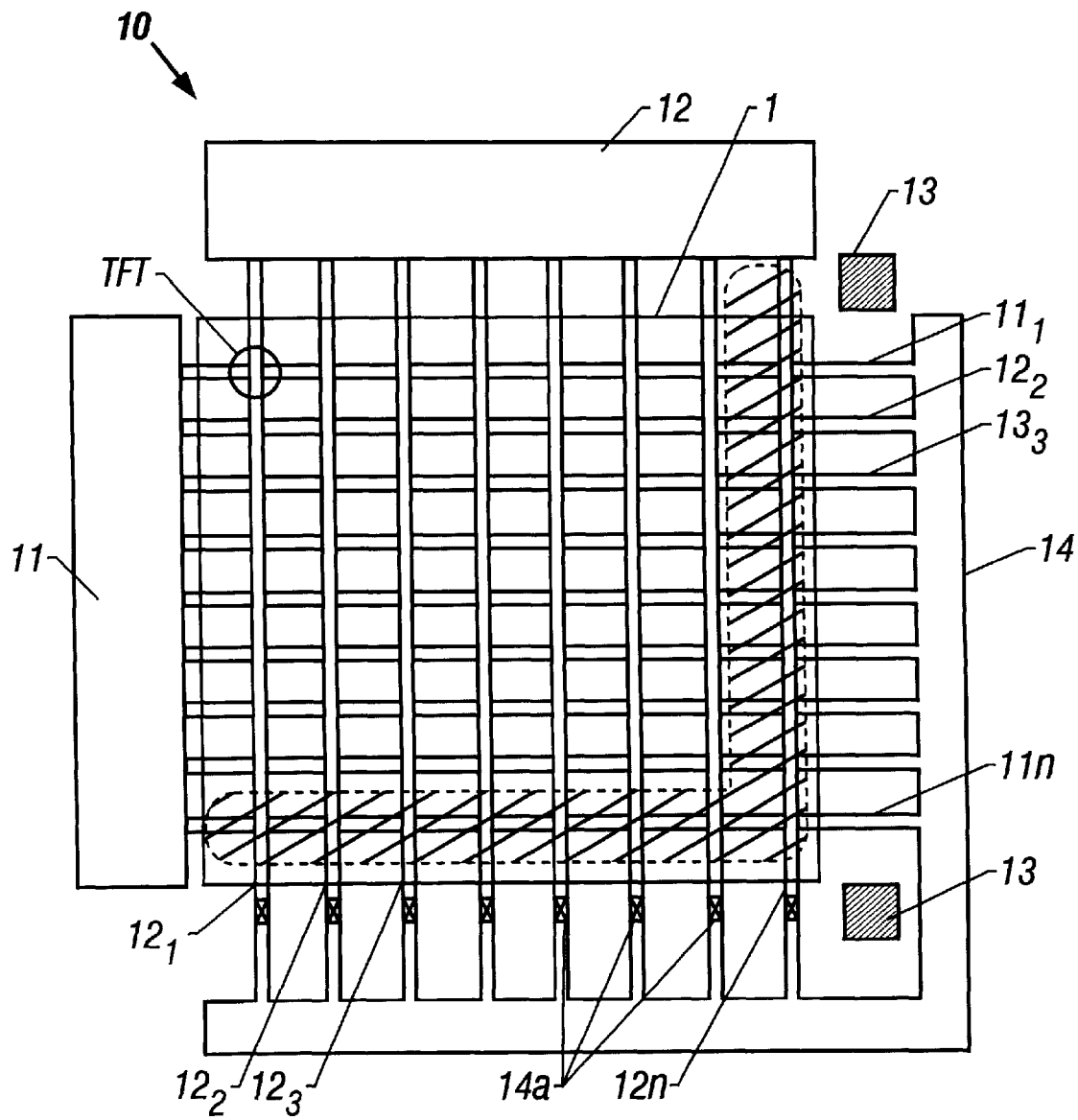
FIG. 6 shows a constitution of a conventional LCD.

FIG. 1 shows a constitution of an LCD according to a first embodiment of the present invention. Explanation of portions described hereinbefore with reference to FIG. 6 is omitted to avoid redundancy.

Referring to FIG. 1, at each of the terminal end portions of gate bus patterns $11_1$, $11_2$, $11_3$, ... $11_n$ and data bus patterns $12_1$, $12_2$, $12_3$ ... $12_n$, where a short ring 14 is connected, there is formed a discharge accelerating structure 14A as is shown in FIG. 2.

Figure 2:
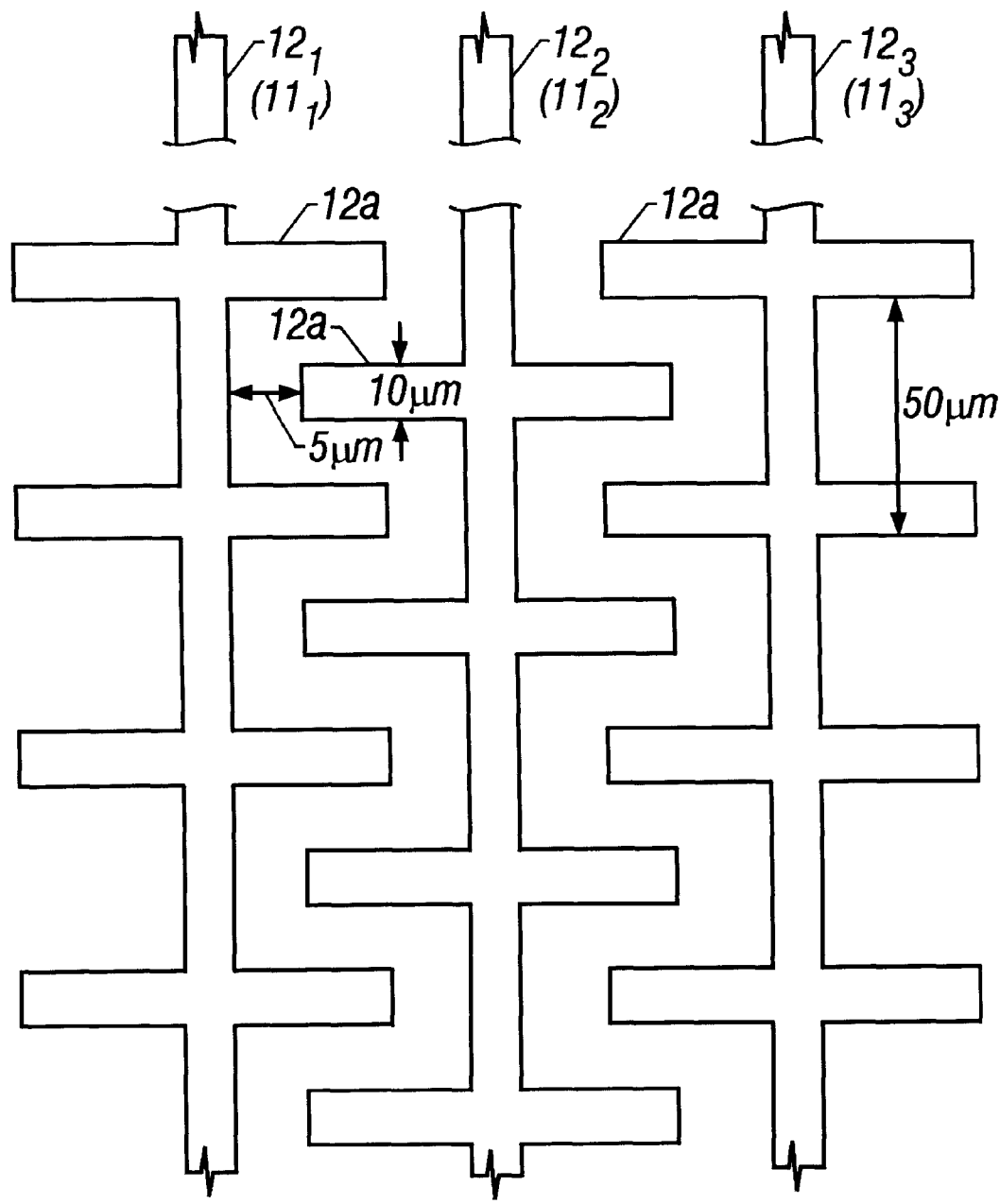
FIG. 2 show a main portion of the device shown in FIG. 1.

Referring to FIG. 2, the discharge accelerating structure 14A is constructed by a plurality of branches 12a formed on each of the gate bus patterns $11_1$, $11_2$, $11_3$, ... $11_n$ or the data bus patterns $12_1$, $12_2$, $12_3$ ... $12_n$, and the front end of each of the branches 12a is provided to the vicinity of the neighboring conductor pattern to a distance corresponding to a half or less of the minimum pattern width which depends on the design rule. In the example shown in the figure, the minimum pattern width is 10 $\mu$m. Hence, in the example, the front end of the branch 12a formed on the data bus pattern $12_2$ is extended so that the distance between the front end and the corresponding data bus pattern $12_1$ is 5 $\mu$m or less.

By forming branches 12a in a manner whereby the front ends thereof may be brought to the vicinity of the other patterns and to a distance of a half or less of the minimum wire width, plasma discharge generates at the front ends of the branches. This way damage on gate bus patterns or data bus patterns within display region 1 of the LCD, otherwise attributable to plasma discharge, is minimized.

As with short ring 14, the discharge accelerating structure 14A is formed outside the display region 1 of the LCD. Accordingly, it is easily removed once the substrate 10 is divided into individual liquid crystal display panels, and is not included as part of a finished LCD. Structure 14A thus has no negative effects on the operation of a finished LCD.

Furthermore, when performing dry etching or other plasma treatment processes, plasma proceeds from the periphery to the internal portion of the substrate 10 through the gate bus patterns or the data bus patterns. Accordingly, the discharge accelerating structure 14A functions most effectively when formed in the vicinity of the short ring 14 outside the display region 1.

FIG. 1 also shows another discharge accelerating structure 14B which is formed at the periphery of a connection pad 13 on the corner of the substrate to protect the connection pad 13 from discharge.

Figure 3:
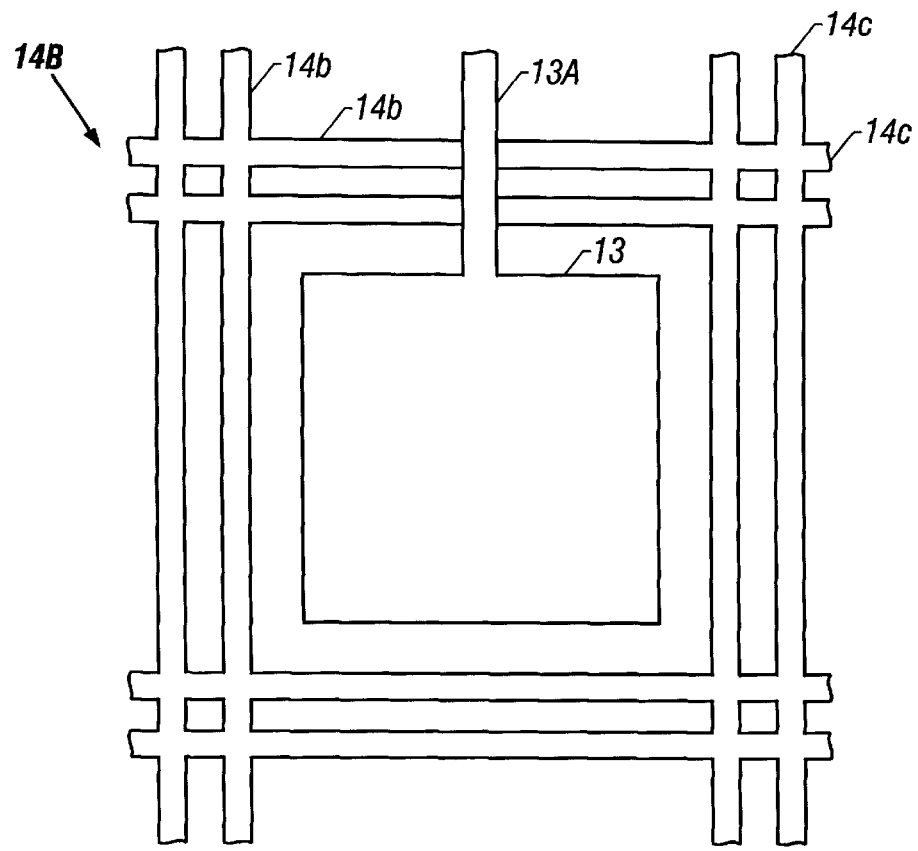
FIG. 3 shows another main portion of the device shown in FIG. 1.

FIG. 3 shows a wiring pattern 13A extended from the connection pad 13. A mesh-like conductor pattern 14b is formed in the layer under the pattern 13A in such a manner that the pattern 14b surrounds the pad 13. The conductor patterns 14b are made of mesh-like or lattice-like patterns each having a protruded end 14c, and the conductor patterns are provided by taking an interval of a half or less of the minimum width of the pattern with each other. In the case where the minimum pattern width of the pattern 14b is 10

μm, a distance of, for example, 5 μm or less exists between any two neighboring conductor patterns. By thus forming a discharge accelerating structure 14B, the discharge in the periphery of the pad 13 is accelerated while suppressing the discharge in which the pad 13 itself is incorporated.

In a conventional structure, after performing dry etching of drain buses, discolored portions attributed to the plasma damage were observed. These portions were generated on most of the drain buses represented by the hatched portion in FIG. 1—particularly in a region corresponding to a length of about ⅓ of the lateral direction in the right end and to a length of about ⅓ in the longitudinal direction in the lower portion. However, the discolored portions were eliminated completely by employing the structure according to the present invention.

Figure 4:
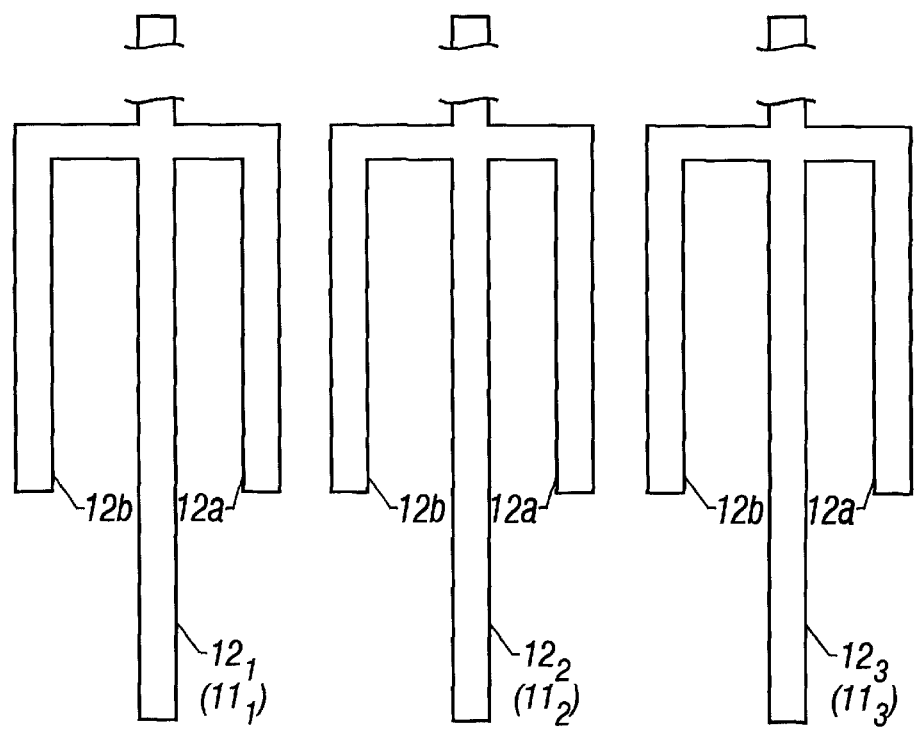
FIG. 4 shows a modification of the device shown in FIG. 1.
Figure 5:
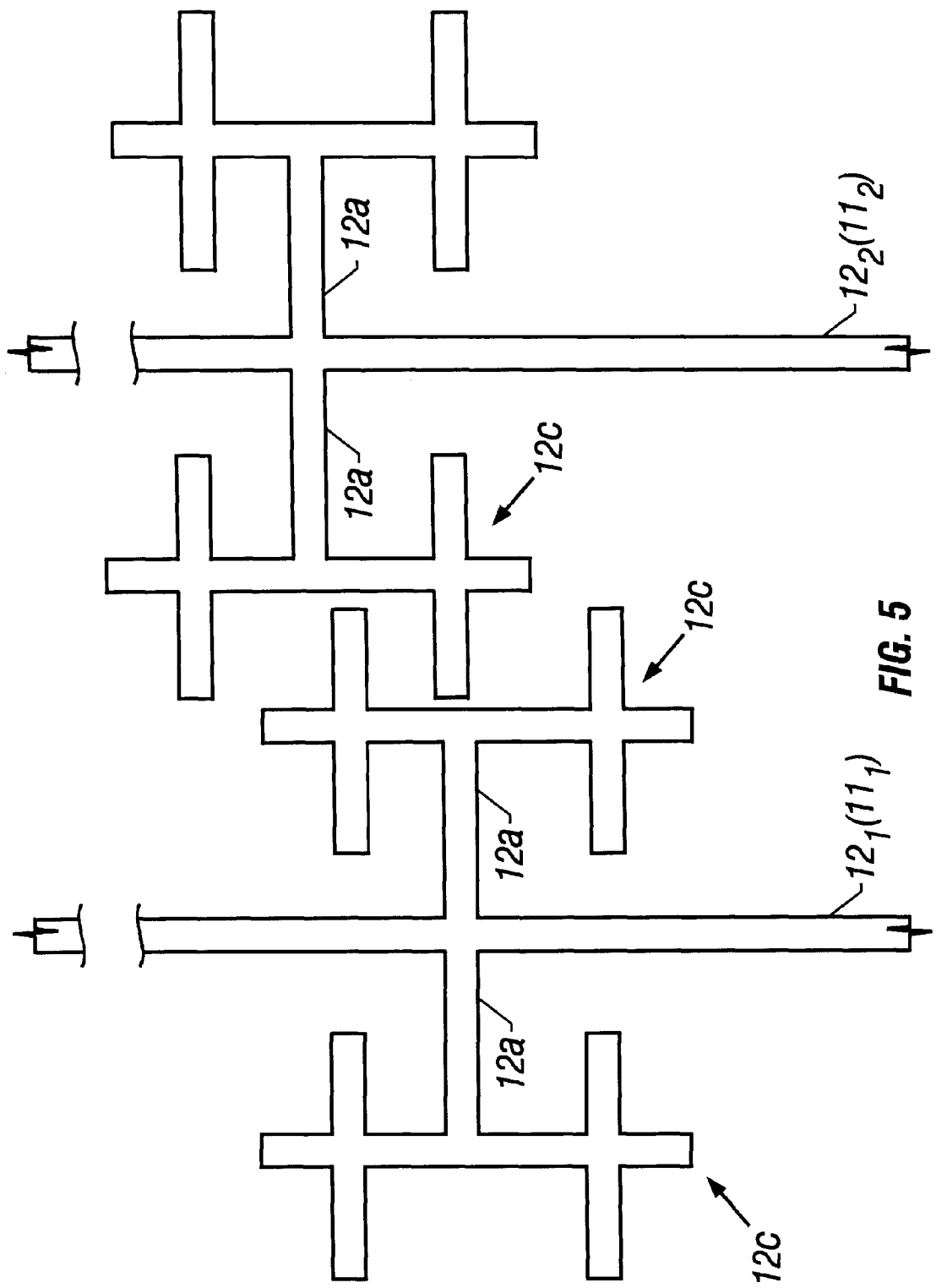
FIG. 5 shows another modification of the device shown in FIG. 1.

FIGS. 4 and 5 show modified discharge accelerating structures 14A corresponding to the structure shown in FIG. 2.

Referring to FIG. 4, branches 12a and 12b are extended in the left and the right sides of each of the gate bus patterns $11_1$ to $11_3$ and of the data bus patterns $12_1$ to $12_3$. The gate bus patterns $11_1$ to $11_3$ and the data bus patterns $12_1$ to $12_3$ are bent and extended in parallel with each other. The pattern 12a and the pattern 12b neighboring thereto are formed by taking a distance therebetween corresponding to a half or less of the minimum pattern width. As a result, the occurrence of plasma discharge is accelerated at that portion.

In the constitution shown in FIG. 5, pattern 12a is extended on the both sides of the pattern $12_1$ and the pattern $12_2$, or on the pattern $11_1$ and the pattern $11_2$. The extended patterns comprise a branched pattern 12c on the ends thereof. In this constitution, the distance between the branched pattern 12c of the conductor pattern $12_1$ and the branched pattern 12c of the conductor pattern $12_2$ becomes as small as to correspond to a half or less of the minimum wire width of the conductor pattern $12_1$ or the conductor pattern $12_2$. This constitution accelerates the discharge which occurs in the discharge accelerating structures 14A so as to minimize the damage attributed to the discharge which occurs on the conductor $12_1$ or $12_2$.

Thus, as described in detail in the foregoing, the present invention provides a process for fabricating an LCD characterized in that a discharge accelerating pattern structure is formed in the wiring pattern constituting a liquid crystal display panel in such a manner so that the display region of the liquid crystal display panel is excluded, provided that the distance between the neighboring wiring patterns is set at a length twice or less as long as that of the minimum wire width of the wiring pattern. According to this constitution, plasma discharge is allowed to occur selectively on the discharge accelerating pattern structure, while preventing damage ascribed to plasma discharge from occurring on the wiring patterns.

While the invention has been described in detail and with reference to specific embodiments thereof, it will be apparent to one skilled in the art that various changes and modifications can be made therein without departing from the spirit and scope thereof.

What is claimed is:

1. A process of fabricating a liquid crystal electro-optical device, comprising:

forming a plurality of gate bus patterns having discharge accelerating patterns extending from said gate bus patterns, wherein said discharge accelerating patterns are provided outside a display region of said liquid crystal electro-optical device, and wherein a distance between at least one of said discharge accelerating patterns on one of adjacent pair of the gate bus patterns and at least one of said discharge accelerating patterns on the other of said adjacent pair of the gate bus patterns is half or less of a minimum width of said gate bus patterns.

2. A process according to claim 1, wherein said gate bus patterns are formed by dry etching.

3. A process according to claim 1, wherein said distance is set in order to facilitate a discharge between said adjacent pair of the gate bus patterns.

4. A process according to claim 1, wherein said one of said discharge accelerating patterns comprises a branch having an end, and a distance between said end and said the other of said adjacent pair of said gate bus patterns is half or less of said minimum wire width of said gate bus patterns.

5. A liquid crystal electro-optical panel comprising:

a substrate; and gate bus patterns having discharge accelerating patterns extending from said gate bus patterns, said gate bus patterns and said discharge accelerating patterns being provided on said substrate, wherein said discharge accelerating patterns are provided outside a display region of said liquid crystal electro-optical panel, and wherein a distance between at least one of said discharge accelerating patterns on one of adjacent pair of the gate bus patterns and at least one of said discharge accelerating patterns on the other of said adjacent pair of the gate bus patterns is half or less of a minimum width of said pair of the gate bus patterns.

6. A panel according to claim 5, wherein said distance is set at such a length that discharge occurs relatively easily therebetween.

7. A panel according to claim 5, wherein said one of said discharge accelerating patterns comprises a branch having an end and extending from said one of said gate bus patterns, a distance between said end and said another of said gate bus patterns being half or less of said minimum wire width of said gate bus patterns.

8. A process of fabricating an active matrix display device comprising the steps of:

forming a plurality of thin film transistors arranged in a matrix over a substrate and a driver circuit over said substrate for driving said thin film transistors;

forming at least first and second gate bus lines over said substrate wherein each of said gate bus lines is provided with a discharge accelerating pattern which projects directly from said gate bus lines, wherein a distance between the discharge accelerating pattern projected from said first gate bus line and the discharge accelerating pattern projected from said second gate bus line is half or less of a width of said gate bus lines.

9. The process according to claim 8 wherein said discharge patterns extend perpendicularly to said first and second gate bus lines, respectively.

10. A process of fabricating a liquid crystal electro-optical device, comprising:

forming a plurality of bus patterns having discharge accelerating patterns extending from said bus patterns;

wherein said discharge accelerating patterns are provided outside a display region of said liquid crystal electro-optical device, and wherein a distance between at least one of said discharge accelerating patterns on one of adjacent pair of the bus patterns and at least one of said discharge accelerating patterns on the other of said adjacent pair of the bus patterns is half or less of a minimum width of said bus patterns.

11. A liquid crystal electro-optical panel comprising:

a substrate; and bus patterns having discharge accelerating patterns extending from said bus patterns, said bus patterns and said discharge accelerating patterns being provided on said substrate, wherein said discharge accelerating patterns are provided outside a display region of said liquid crystal electro-optical panel, and wherein a distance between at least one of said discharge accelerating patterns on one of adjacent pair of the bus patterns and at least one of said discharge accelerating patterns on the other of said adjacent pair of the bus patterns is half or less of a minimum width of said pair of the bus patterns.

12. A process of fabricating an active matrix display device comprising:

forming a plurality of thin film transistors arranged in a matrix over a substrate and a driver circuit over said substrate for driving said thin film transistors;

forming at least first and second bus lines over said substrate wherein each of said bus lines provided with a discharge accelerating pattern which projects directly from said bus lines, wherein a distance between the discharge accelerating pattern projected from said first bus line and the discharge accelerating pattern projected from said second bus line is half or less of a width of said bus lines.

13. A liquid crystal electro-optical panel comprising:

a substrate; and data bus patterns having discharge accelerating patterns extending from said data bus patterns, said data bus patterns and said discharge accelerating patterns being provided on said substrate, wherein said discharge accelerating patterns are provided outside a display region of said liquid crystal electro-optical panel, and wherein a distance between at least one of said discharge accelerating patterns on one of adjacent pair of the data bus patterns and at least one of said discharge accelerating patterns on the other of said adjacent pair of the data bus patterns is half or less of a minimum width of said pair of the data bus patterns.

14. A process of fabricating a liquid crystal electro-optical device, comprising:

a step of forming data bus patterns having discharge accelerating patterns extending from said data bus patterns, wherein said discharge accelerating patterns are provided outside a display region of said liquid crystal electro-optical device, and wherein a distance between at least one of said discharge accelerating patterns on one of adjacent pair of the data bus patterns and at least one of said discharge accelerating patterns on the other of said adjacent pair of the data bus patterns is half or less of a minimum width of said pair of the data bus patterns, which is selected to provide relatively easy discharge.

15. A process of fabricating an active matrix display device comprising the steps of:

forming a plurality of thin film transistors arranged in a matrix over a substrate and a driver circuit over said substrate for driving said thin film transistors;

forming at least first and second data bus lines over said substrate wherein each of said data bus lines is provided with a discharge accelerating pattern which projects directly from said data bus lines, wherein a distance between the discharge accelerating pattern projected from said first data bus line and the discharge accelerating pattern projected from said second data bus line is half or less of a width of said data bus lines.

16. The process according to claim 15 wherein said discharge patterns extend perpendicularly to said first and second data bus lines, respectively.

* * * * *